United States Patent [19]

Eckle

[11] Patent Number: 4,486,131
[45] Date of Patent: Dec. 4, 1984

[54] TURNING TOOL FOR MACHINING THE ENDS OF SHAFTS, JOURNALS, TUBES AND THE LIKE

[75] Inventor: Otto Eckle, Löchgau, Fed. Rep. of Germany

[73] Assignee: Komet Stahlhalter-und Werkzeugfabrik, Robert Breuning, GmbH, Besigheim, Fed. Rep. of Germany

[21] Appl. No.: 388,332

[22] Filed: Jun. 14, 1982

[30] Foreign Application Priority Data

Jul. 16, 1981 [DE] Fed. Rep. of Germany ....... 8120797

[51] Int. Cl.³ ............................................. B23B 29/03
[52] U.S. Cl. .................................... 408/185; 408/197; 407/39; 407/46; 82/2 E; 82/36 R; 82/36 A
[58] Field of Search .............. 82/36 R, 2 E, 25, 36 A; 407/67, 68, 69, 70, 71, 31, 36–40, 45, 46, 47, 87, 88, 94, 95, 101, 108; 408/146, 181, 197, 185; 279/83

[56] References Cited

U.S. PATENT DOCUMENTS

| 663,455 | 12/1900 | Muehlberg | 407/45 |
|---|---|---|---|
| 2,253,028 | 8/1941 | Hassig | 407/45 |
| 2,369,014 | 2/1945 | Bruns | 82/36 R |
| 2,559,950 | 7/1951 | Davis | 407/39 |
| 2,687,563 | 8/1954 | Bader | 407/71 |
| 2,848,913 | 8/1958 | Thomsen | 82/36 R |
| 2,900,705 | 8/1959 | Walker | 82/36 R |
| 2,916,802 | 12/1959 | Blomstrand | 82/36 R |
| 3,079,815 | 3/1963 | Briney | 82/36 R |
| 3,270,396 | 9/1966 | Williams | 407/39 |
| 3,363,299 | 1/1968 | Gowanlock | 407/39 |
| 3,521,507 | 7/1970 | Yogus et al. | 407/37 |
| 3,529,500 | 9/1970 | Vicars | 82/36 R |
| 4,018,112 | 4/1977 | Heaton et al. | 82/36 A |
| 4,163,624 | 8/1979 | Eckle | 407/43 |

FOREIGN PATENT DOCUMENTS

537399 of 1941 United Kingdom ................. 407/39

Primary Examiner—Leonidas Vlachos
Assistant Examiner—Jerry Kearns
Attorney, Agent, or Firm—Flynn, Thiel, Boutell & Tanis

[57] ABSTRACT

The turning tool has a disc-shaped base element 1 connectable to the spindle of a lathe and four toolholders 6, 7, each with one or more cutting plate supports 12, adjustable radially relative to the rotary axis (D-D), clampable with an adjusting screw 25, and carrying a cutting plate 23. The base element 1 has a housing bore parallel to the axis (D-D) of rotation to receive a cylindrical shank 5 of each toolholder 6 or 7. Each toolholder 6, 7 has an axial adjusting screw 14 screwable parallel to the rotary axis D-D. A pin 8 in the shank 5 cooperates with an axial groove 9 and is fixed by means of a screw 10 cooperating with a recess 11 in the pin 8 to clamp the shank 5 in the adjusted axial position. Different cutting plate supports 12a, 12b and 12c can be used to enable a variety of machining operations to be carried out.

12 Claims, 11 Drawing Figures

TURNING TOOL FOR MACHINING THE ENDS OF SHAFTS, JOURNALS, TUBES AND THE LIKE

FIELD OF THE INVENTION

The invention relates to a turning tool for machining the ends of shafts, journals, tubes and the like, the tool having a disc-shaped base element connectable to the spindle of a lathe and a plurality of toolholders fixed detachably to the said element, each toolholder having at least one cutting plate support which is adjustable radially of the axis of rotation and clampable by means of an adjusting screw, and carries a cutting plate.

BACKGROUND OF THE INVENTION

The expression "end machining" is to be understood to mean the complete machining of the end of a shaft, of a journal, or of a tube with a single turning tool, which has a plurality of firmly adjusted cutting plate supports with cutting plates arranged thereon. Thus, for example, a surface machining of the end face, a machining of the outside diameter over a limited length, the working of bevels on the outside diameter and the production of a centring bore is performed in a single axial feed of the turning tool relative to the workpiece or vice versa.

In a known turning tool of the type initially defined, the toolholders are screwed firmly to the end face of the base element. In order to achieve accurate positioning of the toolholder, the end face in this case has grooves in which the toolholders engage. At least one cutting plate support is radially adjustable by means of an adjusting screw on each toolholder. Although it is possible with this turning tool to machine different diameters within a certain range of diameters, nevertheless the machine surfaces always have the same distance from the flat end surface of the machined end of the workpiece. It is only by exchanging the toolholders for other toolholders adapted to the workpiece to be machined that the turning tool can be used for another workpiece. However, since workpiece ends may have the widest variety of shapes, it would be necessary to have a large number of different toolholders in stock, or to prepare suitable toolholders each time. Even the production of the grooves in the end face of the base element is an onerous operation. In addition to this, the surfaces engaging the groove must be accurately machined on each toolholder.

It is the underlying aim of the invention to develop a turning tool for machining the ends of shafts, journals, tubes and the like of the type initially defined, which permits the machining of a large number of different workpiece ends with a few basic types of toolholder, which can be adapted to the relevant workpiece end without substantial modification, and is at the same time of simple construction.

This is achieved according to the invention in that the base element has for each toolholder at least one housing bore parallel to the axis of rotation, and the toolholder has a cylindrical shank fitting into the latter, that each toolholder has an adjusting screw which is screwable parallel to the axis of rotation or the shank axis, and is braced against the base element or against a support element connected to the latter, and that means for clamping and for securing against rotation are provided between the shank and the base element, by means of which the shank is clampable in the adjusted axial position.

The production of the entire turning tool is greatly simplified by the adoption of cylindrical housing bores and cylindrical shank fitting into the latter. The disc-shaped base element with the cylindrical housing bores can then be produced so simply that even the user of the tool can prepare such a base element for himself if the workpiece to be machined should make this necessary. However, this is not likely to be the case generally, because due to the adjustability of the toolholders in the axial direction and the additional adjustability of the cutting plate supports in the radial direction, the turning tool can be adapted to the widest variety of workpiece ends to be machined. It is also possible to effect an adaptation by exchanging cutting plate supports for such of a different shape.

The possibilities of adaptation can be extended still further if the base element has a plurality of housing bores arranged at different radial distances from the axis of rotation. In fact, if the radial adjustment range of a cutting plate support is not sufficient, then the relevant toolholder can easily be removed from the base element by releasing the clamping device and its shank can be inserted into a housing bore located radially farther outwards or farther inwards and clamped there. The turning tool therefore permits machining operations over an extremely wide range of diameters.

It is found that, in a preferred embodiment of the invention, only two basic forms of toolholders are required and a large number of the widest variety of workpiece ends can be machined with them.

BRIEF DESCRIPTION OF THE DRAWINGS

The invention will now be described in more detail, solely by way of example, with reference to the accompanying drawings, in which.

DETAILED DESCRIPTION

In FIGS. 1 to 4 of the drawings there is shown a turning tool which has a disc-shaped base element 1, the front end face 1a and the rear end face 1b of which are preferably surface ground. The base element 1 abuts with its rear base surfaces 1b against a support element 2 and is connected to the latter by screws, not shown. The support element 2 is adapted for attachment to the spindle of a lathe, and may have a standard cone 3 for this purpose, or may be constructed as a flange plate.

In the examplary embodiment illustrated in FIGS. 1 to 4, the base element 1 has four housing bores 4, which are arranged at suitable radial distances from the axis D—D of rotation and extend parallel to this axis of rotation. The diameter of these housing bores may be approximately 25 mm for smaller turning tools and approximately 36 mm for larger ones. The housing bores 4 serve to house identically conformed cylindrical shanks 5 of two pairs of toolholders 6 and 7, which are described more fully below. Since the configuration of the shank 5 and of the elements serving for their clamping, rotational securing and axial adjustment are similar in the case of both pairs of toolholders 6 and 7, these elements are designated by the same reference numerals and are described first.

A clamping pin 8, which serves as a means for clamping and securing the shank 5 against rotation, is provided in the shank 5 and engages an axially parallel groove 9 recessed into the wall of the housing bore 4. A screw 10, which is arranged parallel to the shank axis A—A, has a conical head 10a thereon which is received in a conical countersink 11 in a clamping pin midlength thereof, and to actuate the clamping pin 8. The axes of the screw 10 and of the conical countersink 11 are arranged to be mutually offset, so that when the screw 10 is tightened the clamping pin 8 is forced to move radially outwards by the cooperation of the conical head 10a with the conical countersink 11. Instead of a conical countersink, the clamping pin could have a transverse groove fitting the conical head and extending transversely to the clamping pin axis.

The clamping pin 8 is advantageously adjustable in a plane perpendicular to the adjustment direction V (indicated in FIG. 1) of a cutting plate support 12 or 13 arranged on the toolholder 6 or 7. Consequently, the radial adjustment of the cutting plate support relative to the axis D—D of rotation does not change when the clamping pin 8 is tightened.

Correspondingly the axially parallel groove 9 is arranged in each case in a plane perpendicular to the plane passing through the axis A—A of the housing bore and the axis D—D of rotation. This makes possible a particularly simple and accurate determination and production of the position of the axially parallel groove 9.

The axially parallel groove 9 advantageously has a semi-circular cross-section, and the clamping pin 8 has a head 8a fitting the latter. In addition to making it simple to produce the axially parallel groove 9, this configuration has the advantage that after the screw 10 has been tightened, the head 8a of the clamping pin 8 engages the groove without play in the circumferential direction of the housing bore 4.

For axial adjustment, each toolholder 6, 7 has an adjusting screw 14 which is screwable parallel to the axis D—D of rotation and the shank axis A—A, and is preferably arranged at the shank end of the toolholder 6, 7. The screw 14 is accessible through a bore 15 with an entrance in the region of the cutting plate supports 12, 13. In the case of the toolholder 6 (FIG. 4) the adjusting screw 14 and the bore 15 are provided in the shank 5, whereas in the case of the toolholder 7 (FIGS. 3 and 10) the adjusting screw 14 and the bore 15 are provided in a head part 16. In both cases, however, the bore 15 serves for the passage of a hexagon key, which is insertible into a corresponding hexagon 14a in the adjusting screw. The diameter of the bore 15 is dimensioned so that it corresponds approximately to the circumcircle diameter of the hexagon key, so that the latter is guided directly into the relevant female hexagon 14a.

Figure 2:
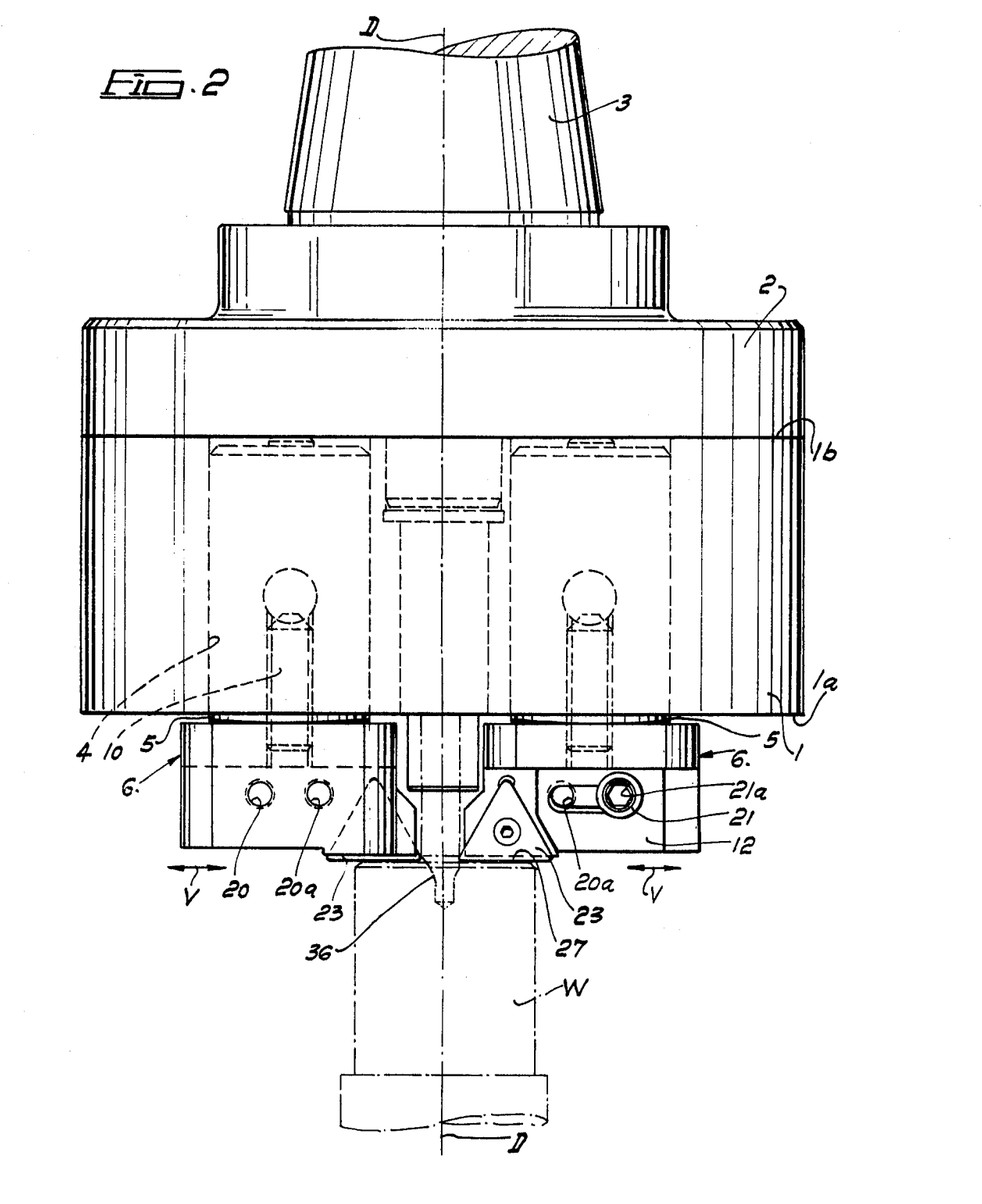
FIG. 2 is a side elevational view looking in the direction of the arrow II in FIG. 1, some of the toolholders being omitted.
Figures 4, 5:
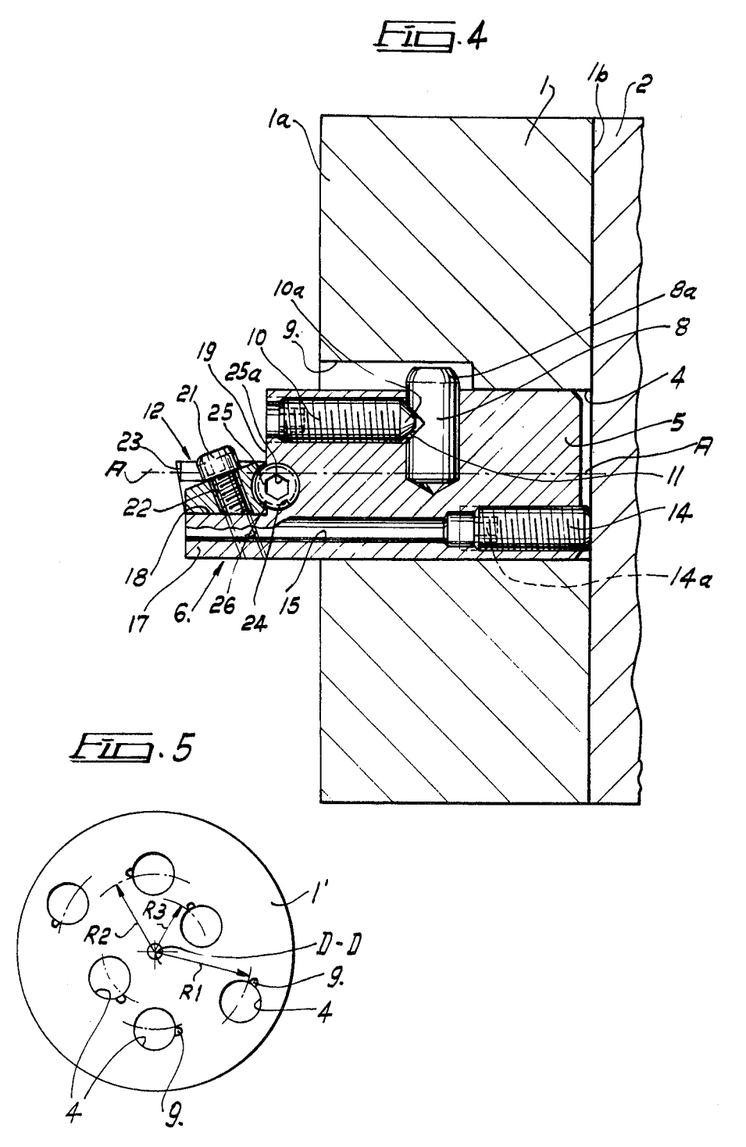
FIG. 4 is a sectional view taken along the line IV—IV of FIG. 1.
FIG. 5 is an end view of a second example of the base element of an embodiment of the invention.
Figure 6:
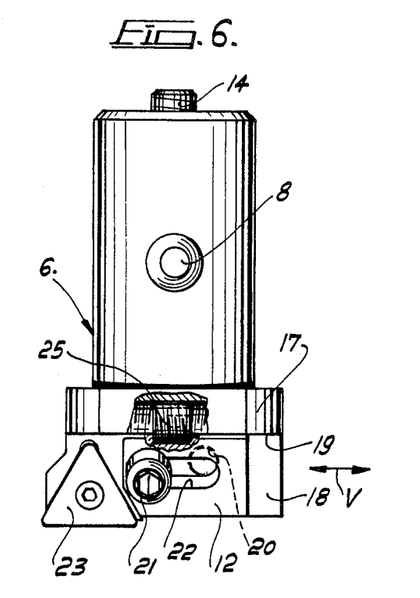
FIG. 6 is a view of a first type of a toolholder.

A first type of a toolholder 6 is illustrated in detail principally in FIGS. 2, 4 and 6. It has at its head part 17, to brace the cutting plate support 12, a bracing surface 18 oriented parallel to the shank axis A—A and an abutment surface 19 oriented in a radial plane. Two screwthreaded bores 20 and 20a (FIG. 2) are provided in the bracing surface somewhat obliquely to the latter, but mutually parallel, each of which serves for screwing in a clamping screw 21. The cutting plate support 12 has a slot 22 extending radially to the shank axis A—A, through which the clamping screw 21 passes. The cutting plate support 12 also carries, in a recess, an exchangeable cutting plate 23.

For the accurate radial adjustment of the cutting plate support 12, a screwthreaded bore 24 extending parallel to the abutment surface 19 and to the bracing surface 18 is provided in the head part 17 of the toolheader 6, and is partly open at the abutment surface 19. A short grub screw 25 is screwable in this screwthreaded bore as an adjusting screw for the cutting plate support 12. This grub screw 25 is received in a recess 26 in the cutting plate support 12 which has approximately the same length as the grub screw. When the clamping screw 21 is slackened slightly, the grub screw 25 can be rotated by means of a hexagonal key inserted into its female hexagon 25a, whereby the grub screw 25 is adjusted in the direction of the screwthreaded bore 24 and entrains the cutting plate support 12. When its cutting plate 23 has attained the desired adjustment the clamping screw 21 is tightened again.

The first basic type of toolholder 6 is primarily intended, as illustrated in FIG. 2, for machining end faces 27 of a workpiece, e.g. a shaft W. The end face may, as illustrated in FIG. 2, be machined by both cutting plates 23 of two similarly constructed toolholders 6. If the end face 27 exhibits greater dimensions in the radial direction, then the cutting plate supports 12 on the two toolholders 6 are adjusted differently so that the cutting plate 23 of the one cutting plate support 12 machines e.g. the inner part of the end face 27, and the other cutting plate 23 the outer part of the end face 27. Due to the mutually offset arrangement of two screwthreaded bores 20 and 20a, the cutting plate support 12 can be adjusted over a comparatively wide range.

Figure 7:
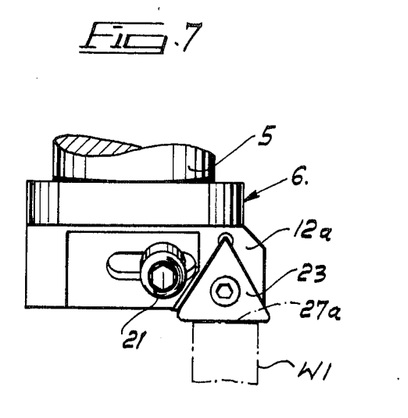
FIGS. 7, 8, 9 are views of various cutting plate supports suitable for use with the toolholder of FIG. 6.

However, if as illustrated in FIG. 7 an end face 27a is required to be machined which lies on a larger diameter, then instead of the cutting plate support 12 illustrated in FIG. 6 it is also possible to use the cutting plate support 12a illustrated in FIG. 7, which has its cutting plate 23 on the opposite side. It is thus possible to machine a large range of diameters merely by exchanging a small part, namely the cutting plate support.

This range of diameters can be extended still further when the base element 1', as illustrated in FIG. 5, has a plurality of housing bores arranged at different radial distances R1, R2 and R3. Then, according to the relevant machining requirements, the shank 5 of the toolholder 6 is inserted in the appropriate housing bore 4. The same also applies with regard to the toolholder 7.

Figure 8:
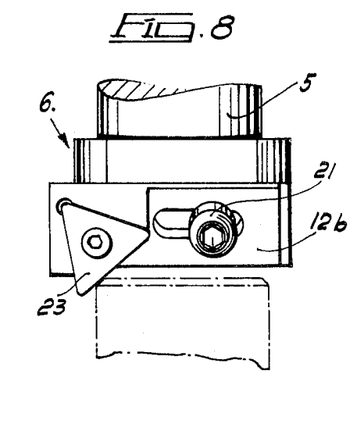
Figure 9:
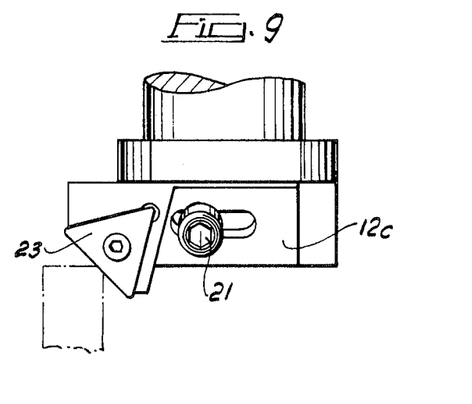

In addition to the cutting plate supports 12 and 12a already described, the cutting plate supports 12b and 12c illustrated in FIGS. 8 and 9 may also be used on the toolholder 6, permitting the bevelling of an outside diameter in the one case and of an inside diameter in the other. A second type of toolholder 7 is illustrated in detail in FIGS. 3, 10 and 11 and described below. This type of toolholder 7 likewise has a head part 16, the centre of which is however preferably arranged offset in relation to the shank axis A—A. In this way the base element 1 or 1' can be made of comparatively small diameter.

Figure 10:
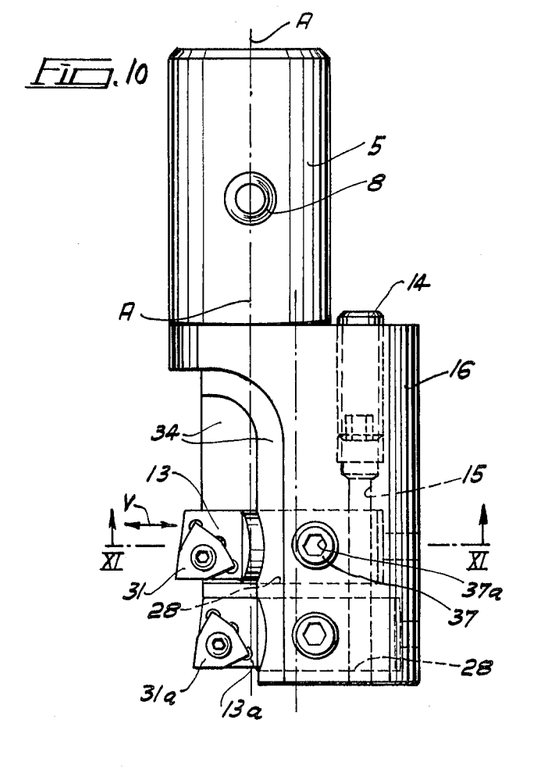
FIG. 10 is a view of a second type of toolholder.
Figure 11:
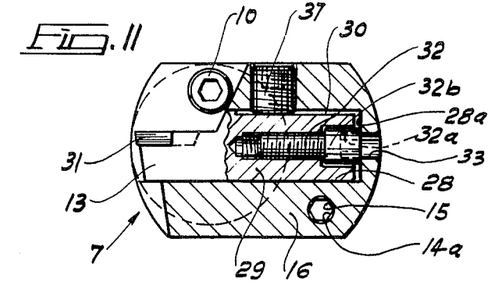
FIG. 11 is a sectional view taken along the line XI—XI of FIG. 10.

At least one blind bore 28 (two are shown in FIG. 10) oriented radially with respect to the shank axis A—A with a cutting plate support 13 with cylindrical projection 29 (indicated in FIG. 11) slidable therein, is arranged in the head part 16. The projection 29 has a planar clamping surface 30, which is engaged by a clamping screw 37 screwable perpendicularly to the blind bore axis in the head part 16. In order to adjust the cutting plate support 13, which likewise carries an exchangeable cutting plate 31, an adjusting screw 32 is coaxially provided in the cylindrical projection 29 and is braced by its head 32b against the bottom 28a of the blind bore 28. The head 32b has a female hexagon 32a, which is accessible through a bore 33 provided in the head part 16. After releasing the clamping screw 37, the adjusting screw 32 can be rotated by means of a hexagonal key which is passed through the bore 33, and the cutting plate 31 of the cutting plate support 13 can thus be brought into the desired position. The clamping screw 37 is retightened afterwards.

In order to achieve optimum support of the cutting plate support 13 on the one hand, and to ensure good swarf removal on the other hand, the head part 16 has a swarf space 34 open at the end face and upwards in the region above the cutting plate 31.

The toolholder 7 may also, as illustrated in FIG. 10, have one or more axially offset cutting plate supports 13a, each of which is radially adjustable in the same manner. The adjustment in the axial direction is effected by means of the adjusting screw 14. Because a blind bore is comparatively simple to produce, an already existing toolholder 7 can easily be provided with a further blind bore, if this should be necessary for the particular machining requirement. The user of the turning tool can carry out this modification himself.

Figure 3:
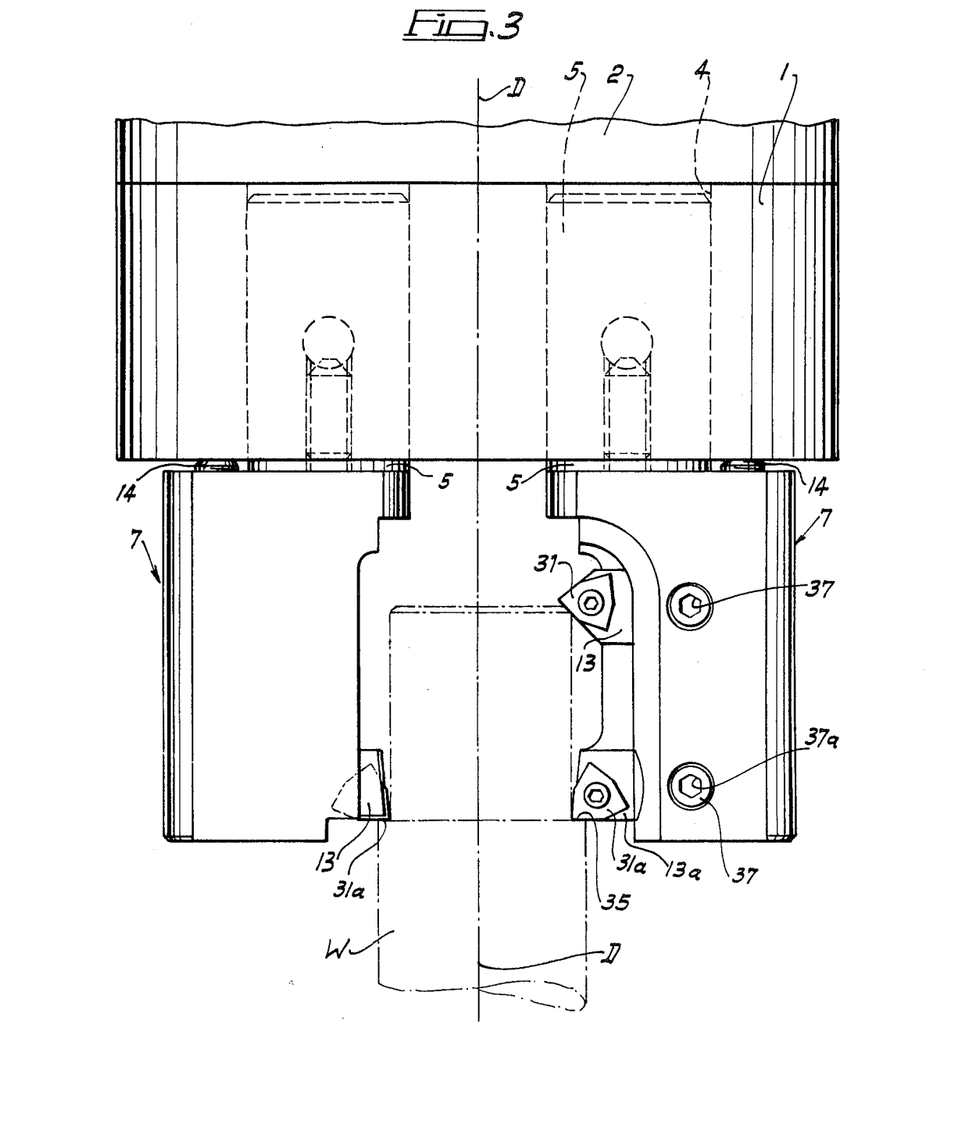
FIG. 3 is a side elevational view looking in the direction of the arrow III in FIG. 1, other of the toolholders being omitted.

Toolholders such as the toolholder 7 are used, as illustrated in FIG. 3, principally for the outside machining of the end of a shaft W. In this case the outer circumference and a shoulder 35 are machined by the two cutting plates 31a, whilst the cutting plate support 13 with the cutting plate 31 is adjusted so that it bevels the shaft end.

Figure 1:
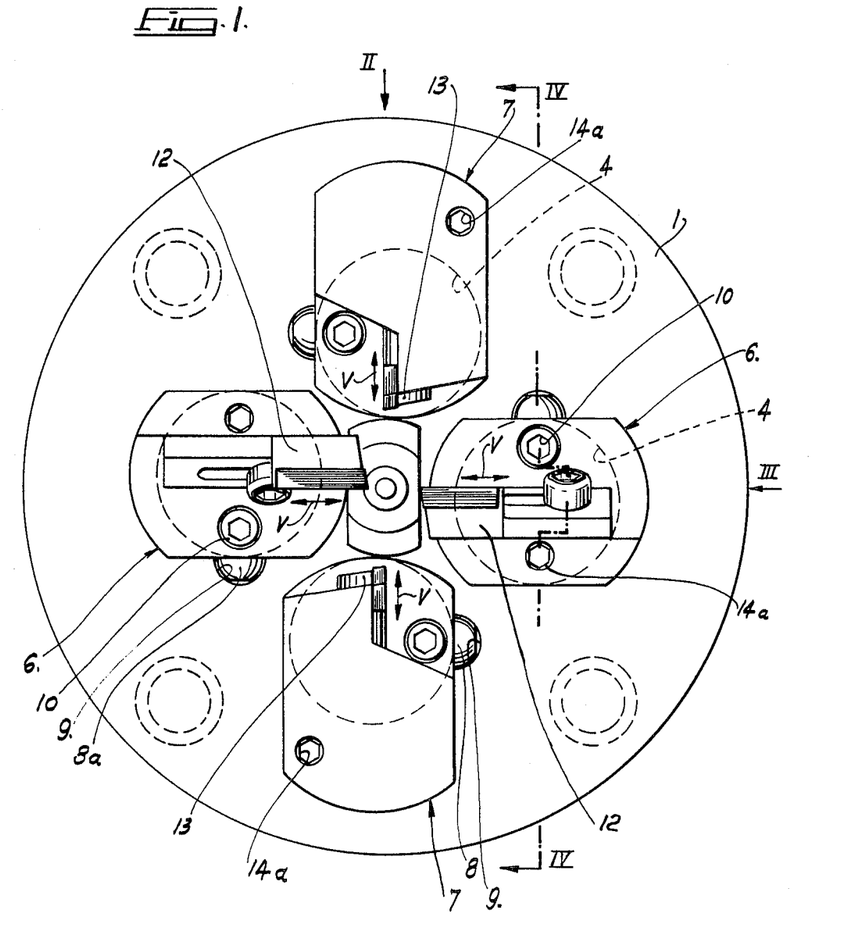
FIG. 1 is an end view of a turning tool embodying the invention.

In order to achieve the simplest possible production of the housing bores 4, they are conveniently executed as through bores. It is also convenient to surface grind the front and rear end faces 1a and 1b of the base element 1. The front end face 1a can then serve for positioning measuring instruments by means of which precise adjustment of the cutting plate supports 12 and 13 with the cutting plates 23 and 31 arranged on them can be performed in the manner described hereinbefore. In this case not only a radial adjustment of the cutting plate support is possible, but also an axial adjustment by axial adjustment of the toolholders 6, 7 can be carried out by means of the adjusting screws 14. After all the tools have been correctly adjusted, the outer circumferential surface, the shoulder 35, the plane surface 27 and the bevel between the plane surface and the outer circumferential surface can be machined in a single machining operation. In addition, a centring drill 36, which simultaneously produces a centring bore at the end of the shaft W, may also be inserted into the base element 1, as indicated in FIGS. 1 and 2.

Because the base element 1 with the housing bores 4 and the grooves 9 is a comparatively simple component, the user may if desired produce a suitable base element himself if the numerous possibilities of adjustment enumerated above should prove insufficient for particular machining jobs. It is convenient if, in the tool according to the invention, all the adjusting screws 14, 25 and 32 and clamping screws 21 and 37 have female hexagons 14a, 21a, 25a, 32a and 37a of the same size. The adjusting and clamping of the toolholders 6 and 7 and of the cutting plate supports 12, 13 and 13a can then be performed with one and the same hexagonal key.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A turning tool having a disc-shaped base element adapted to be connected to a rotatable spindle of a tool machine, said turning tool comprising: a plurality of toolholders and mounting means for mounting said toolholders on said base element, each of said toolholders having a bracing surface on which at least one cutting plate support is mounted, means for facilitating an adjustment of said cutting plate support radially of the axis of rotation of said base element and independent of any adjustment of the position thereof in a direction parallel to said axis of rotation, clamping means for fixing the radial position of said cutting plate support to said bracing surface, said mounting means including for each said toolholder at least one cylindrical housing bore in said base element, the axis of which extends parallel to said axis of rotation, each said toolholder having a cylindrical shank fitting into said cylindrical bore, each said toolholder having an adjusting screw thereon which extends parallel to said axis of rotation and the axis of said cylindrical shank, and is braced against at least one of said base element and a head part on said base element for effecting an axial adjustment of said cylindrical shank and thereby the axial position of said cutting plate support, and clamping and securing means provided between said shank and said base element for securing said cylindrical shank against rotation with respect to said base element and for securing the axial position of said shank, said clamping and securing means including a radially extending opening in said shank a clamping pin provided in said opening in said shank, an axially extending threaded bore in said shank intersecting said radially extending opening, a clamp pin adjusting screw in said threaded bore, an axially extending groove recessed into a wall of said cylindrical housing bore and in a plane oriented perpendicularly to the radial adjustment direction of said cutting plate support, the length of said axially extending groove being arranged in a plane parallel to said axis of rotation and containing said axis of said housing bore, which plane is perpendicular to the plane defined by said axis of said housing bore and said axis of rotation of said turning tool said clamping pin being operatively engaged and radially adjusted relative to said cylindrical shank by means of said clamp pin adjusting screw, said clamp pin being radially movable into and out of engagement with groove.

2. A turning tool according to claim 1, wherein said clamp pin adjusting screw has a conical head thereon, and wherein a prismatic transverse groove is provided in said clamping pin and oriented transversely of an axis of said clamping pin and receiving said conical head therein.

3. A turning tool according to claim 1, wherein said axially extending groove has a semi-circular crosssection and wherein said clamping pin has a head thereon corresponding to said cross section of said groove.

4. A turning tool according to claim 1, wherein said adjusting screw is arranged in the shank end of said toolholder and means defining a bore is provided in said toolholder and which is accessible in a region adjacent said cutting plate support.

5. A turning tool according to claim 1, wherein said base element has a plurality of housing bores arranged at different radial distances from said axis of rotation.

6. A turning tool according to claim 1, wherein said cutting plate support is supported on said bracing surface oriented parallel to said shank axis and an abutment surface oriented in a radial plane, and wherein in said bracing surface there is provided at least one screwthreaded bore for receiving an externally threaded clamping screw therein, said cutting plate support having a radially oriented slot therethrough receiving said clamping screw therein.

7. A turning tool according to claim 6, wherein said toolholder has a further screwthreaded bore therein oriented parallel to said bracing surface and said abutment surface and opening partially outwardly at said abutment surface through an elongated slot, said further bore having an adjusting screw therein operatively coupled to said cutting plate support for facilitating said radial adjustment thereof.

8. A turning tool according to claim 1, wherein at least one of said toolholders has an elongated head part and at least one blind bore therein oriented radially to said shank axis, a cutting plate support having a cylindrical projection thereon is slidably received in said blind bore, said cylindrical projection having a plane clamping surface which is acted upon by a clamp screw screwable perpendicularly to said axis of said blind bore.

9. A turning tool according to claim 8, wherein the longitudinal center axis of said head part is offset relative to said shank axis.

10. A turning tool according to claim 8 or 9, wherein an adjusting screw is provided in said cylindrical projection coaxially thereto and is braced by its head against the bottom of said blind bore and is accessible through a bore provided in said bottom of said blind bore.

11. A turning tool according to claim 8, wherein said head part has a swarf space open at an end face and upwards in the region above a cutting plate on said cutting plate support.

12. A turning tool according to claim 1, wherein said base element has surface ground front and rear end faces, said housing bores are through bores, and said base element abuts by its rear end face a support element which is adapted to be connected to said spindle.

* * * * *